United States Patent
Hogan et al.

(10) Patent No.: US 7,836,928 B2
(45) Date of Patent: Nov. 23, 2010

(54) METHOD OF PRODUCING A TIRE COMPOSITION HAVING IMPROVED SILICA REINFORCEMENT

(75) Inventors: Terrence E. Hogan, Akron, OH (US); Chenchy Jeffrey Lin, Hudson, OH (US)

(73) Assignee: Bridgestone Corporation (JP)

( * ) Notice: Subject to any disclaimer, the term of this patent is extended or adjusted under 35 U.S.C. 154(b) by 1173 days.

(21) Appl. No.: 11/259,485

(22) Filed: Oct. 26, 2005

(65) Prior Publication Data

US 2006/0086450 A1  Apr. 27, 2006

Related U.S. Application Data

(60) Provisional application No. 60/622,189, filed on Oct. 26, 2004.

(51) Int. Cl.
*B60C 5/00* (2006.01)

(52) U.S. Cl. ...................................... 152/450; 524/106

(58) Field of Classification Search ................. 152/450; 524/106

See application file for complete search history.

(56) References Cited

U.S. PATENT DOCUMENTS

| 5,140,055 | A | * | 8/1992 | Hirata et al. | .................. | 524/93 |
| 5,508,333 | A | | 4/1996 | Shimizu | ..................... | 524/424 |
| 5,580,919 | A | | 12/1996 | Agostini et al. | ............. | 524/430 |
| 5,674,932 | A | | 10/1997 | Agostini et al. | ............. | 524/430 |
| 5,811,479 | A | | 9/1998 | Labauze | ..................... | 524/188 |
| 6,008,295 | A | | 12/1999 | Takeichi et al. | ............. | 525/105 |
| 6,608,145 | B1 | * | 8/2003 | Lin et al. | .................. | 525/332.6 |
| 2003/0199626 | A1 | * | 10/2003 | Lin et al. | .................... | 524/492 |

* cited by examiner

*Primary Examiner*—Peter D Mulcahy
(74) *Attorney, Agent, or Firm*—Meredith E. Hooker; Arthur Reginelli

(57) ABSTRACT

Vulcanizable elastomeric compositions and vulcanizates are prepared by employing a nitrogen-containing heterocycle. The nitrogen-containing heterocycle is believed to enhance interaction between a silica particle and a silica-interactive compound.

21 Claims, No Drawings

METHOD OF PRODUCING A TIRE COMPOSITION HAVING IMPROVED SILICA REINFORCEMENT

This application claims the benefit of U.S. Provisional Application No. 60/622,189, filed Oct. 26, 2004, which is incorporated herein by reference.

FIELD OF THE INVENTION

One or more embodiments of this invention relate to a method for preparing a vulcanizable elastomeric composition that is useful in producing tire compositions with improved silica reinforcement.

BACKGROUND OF THE INVENTION

Inorganic fillers, such as silica, impart improved wet traction, rolling resistance, tear strength, snow traction and other performance parameters when used as filler within tire treads. Mixing silica into a tire stock, however, is difficult because silica particles agglomerate extensively and therefore they are not easily dispersed. In addition, silica particles are less compatible than carbon black with rubber molecules. In response, processing and dispersing aids and coupling agents are used during compounding.

In the art of making tires, it is desirable to employ rubber vulcanizates that demonstrate improved rolling resistance, wet skid resistance, and reduced hysteresis loss at certain temperatures. Factors believed to affect these properties include the degree of filler networking (particle agglomeration), the degree of polymer-filler interaction, the cross-link density of the rubber, and polymer free ends within the cross-linked rubber network.

Because precipitated silica has been increasingly used as reinforcing particulate filler in tires, there is a need to overcome the processing problems associated with silica fillers. Additionally, there is a need to increase polymer-filler interaction in silica-filled tires, thereby improving rolling resistance, wear resistance, and wet skid resistance.

SUMMARY OF THE INVENTION

In one embodiment, the present invention provides a method for preparing a tire, the method comprising the steps of mixing ingredients including silica and at least one elastomer to form a first mixture, where the elastomer optionally includes silica-interactive functionalized elastomer, cooling the first mixture, further mixing the first mixture, optionally with additional ingredients including a silica coupling agent and a silica dispersing agent, to form an intermediate mixture, with the proviso that at least one of the ingredients mixed to form the first mixture or the additional ingredients added to form the intermediate composition includes a silica-interactive compound, adding ingredients including a curative to the intermediate mixture to form a vulcanizable mixture, mixing the vulcanizable mixture, forming the vulcanizable mixture into a tire component, building a tire by including the tire component, curing the tire, where a nitrogen-containing heterocycle is added to at least one of said step of mixing ingredients to form a first mixture or said step of further mixing to form an intermediate mixture.

In another embodiment, the present invention also includes a method for forming a mixture, the method comprising mixing a silica particle, a silica-interactive compound, and a nitrogen-containing heterocycle.

DETAILED DESCRIPTION OF ILLUSTRATIVE EMBODIMENTS

In one or more embodiments, vulcanizable compositions are prepared by mixing silica, a silica-interactive compound, and a nitrogen-containing heterocycle. In certain embodiments, the nitrogen-containing heterocycle is believed to enhance the reaction or interaction between the silica and the silica-interactive compound.

Both substituted or unsubstituted nitrogen-containing heterocycles may be used. The nitrogen-containing heterocycle may be aromatic or non-aromatic. In one embodiment, nitrogen-containing heterocycles include compounds defined by the formula

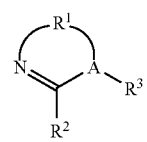

where A is nitrogen, oxygen or sulfur, $R^1$ is a divalent organic group, $R^2$, and $R^3$ are independently a hydrogen atom or a monovalent organic group, or where any two or more of $R^1$, $R^2$, and $R^3$ combine to form a multivalent organic group, which results in a multicyclic compound. In one embodiment, A is nitrogen. In certain embodiments, the nitrogen-containing heterocycle includes a nitrogen-containing ring having from 5 to 7 ring members. In one embodiment, the nitrogen-containing heterocycle includes a nitrogen-containing ring having 5 ring members.

Monovalent organic groups include hydrocarbyl groups such as, but not limited to alkyl, substituted alkyl, cycloalkyl, substituted cycloalkyl, alkenyl, cycloalkenyl, substituted cycloalkenyl, aryl, allyl, substituted aryl, aralkyl, alkaryl, and alkynyl groups. In one embodiment, each group contains from 1 carbon atom, or the appropriate minimum number of carbon atoms to form the group, up to 20 carbon atoms. These hydrocarbyl groups may contain heteroatoms such as, but not limited to, nitrogen, oxygen, silicon, sulfur, and phosphorus atoms.

Divalent organic groups include a hydrocarbylene group such as, alkylene, substituted alkylene, cycloalkylene, substituted cycloalkylene, alkenylene, substituted alkenylene, cycloalkenylene, substituted cycloalkenylene, arylene, and substituted arylene groups. In one embodiment, each group contains from 1 carbon atom, or the appropriate minimum number of carbon atoms to form the group, up to about 20 carbon atoms. These hydrocarbylene groups may contain heteroatoms such as, but not limited to, nitrogen, oxygen, silicon, sulfur, and phosphorus atoms.

Types of nitrogen-containing heterocycles include imidazoles, pyrimidines, thiazoles, thiazolines, histadine, purines, adenines, and guanines.

In one embodiment, the nitrogen-containing heterocycle is a substituted or unsubstituted imidazole, which may be represented by the formula

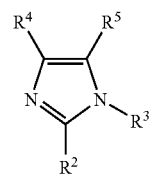

where $R^2$, and $R^3$ are as described above, and $R^4$ and $R^5$ are independently a hydrogen atom or a monovalent organic group, or where any two or more of $R^2$, $R^3$, $R^4$, or $R^5$ combine to form a multivalent organic group, which results in a multicyclic compound.

Imidazoles include imidazole, 4-ethylamino imidazole, 2-mercapto-1-methyl imidazole, 1-methyl imidazole, 2,4,5-triphenyl imidazole, 2-methyl imidazole, 2-ethyl-4-methyl imidazole, and 2-heptadecyl imidazole.

The amount of nitrogen-containing heterocycle employed is not particularly limited, but in one embodiment is preferably from about 0.005 to about 8 percent by weight based on the weight of the silica, in another embodiment from about 0.05 to about 5 percent by weight based on the weight of the silica, in yet another embodiment from about 0.01 to about 3 percent by weight based on the weight of the silica, and in still yet another embodiment from about 0.1 to about 2 percent by weight based on the weight of the silica.

In one or more embodiments, a silica-interactive compound includes a functional group or moiety that will react or interact with silica. The reaction or interaction of the silica-interactive functional group with the silica may occur via chemical reaction, resulting in an ionic or covalent bond between the functional group and the silica particle. Alternately, the interaction of the silica-interactive functional group with the silica may occur via through-space interaction (e.g., hydrogen bonding, van der Waals interaction, etc.). And, the interaction may be an attraction that creates a domain within the rubber matrix of the polymer. Or, the interaction may be an affinity toward filler particles that is activated after processing of a vulcanized rubber formulation, e.g., during cure.

Functional groups that react or interact with silica include basic groups; i.e. they are electron donors or are capable of reacting with a proton. Exemplary groups include alkoxysilyl, amine, hydroxyl, polyalkylene glycol, epoxy, carboxylic acid, and anhydride groups, as well as polymeric metal salts of carboxylic acids. Silica-interactive compounds containing one or more of these functional groups include functionalized elastomers, silica coupling agents, and silica dispersing aids.

In one embodiment, the silica-interactive compound comprises an functionalized elastomeric polymer that includes a silica-interactive functional group. Any silica-interactive group may be used. The silica-interactive functionalized elastomer may include any elastomer conventionally employed in vulcanizable elastomeric compositions. Rubbery elastomers include natural and synthetic elastomers. The synthetic elastomers typically derive from the polymerization of conjugated diene monomers. These conjugated diene monomers may be copolymerized with other monomers such as vinyl aromatic monomers. Other rubbery elastomers may derive from the polymerization of ethylene together with one or more α-olefins and optionally one or more diene monomers.

Useful rubbery elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. In one embodiment, elastomers include homopolymers or copolymers of conjugated $C_4$-$C_{12}$ dienes, $C_8$-$C_{18}$ monovinyl aromatic monomers, and $C_6$-$C_{20}$ trienes. In certain embodiments, elastomers include copolymers of styrene and butadiene.

An elastomer containing an alkoxysilyl functional group may be represented by the formula

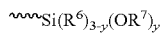

where ∽∽ is an elastomeric polymer, each $R^6$ is independently a halogen or a monovalent organic group, each $R^7$ is independently a monovalent organic group, and y is an integer from 1 to 3. In one embodiment, ∽∽ is an anionically polymerized polymer. The alkoxysilyl functional group may appear anywhere along the elastomeric polymer chain.

In one embodiment, the alkoxysilyl-functionalized elastomer is prepared by reacting a living polymer chain with an alkoxysilane terminating agent. Preparation of living polymer is well-known. Anionically polymerized diene polymers and copolymers containing functional groups derived from alkoxysilane terminating agents are further described in U.S. Pat. Nos. 6,008,295 and 6,228,908, and U.S. Provisional Application No. 60/565,723, which are incorporated herein by reference. In certain embodiments, siloxane terminating agents include tetraethyl orthosilicate.

Where the elastomer contains an amine group, the amine functional group is not particularly limited, and may be a primary, secondary or tertiary amine, cyclic or acyclic. Elastomers having cyclic amino substituents are known in the art, and are further described in U.S. Pat. Nos. 6,080,835, 5,786,441, 6,025,450, and 6,046,288, which are incorporated herein by reference.

The elastomer having a silica-interactive group may include epoxidized rubber. Epoxidized rubber is a modified rubber where some of the rubber's unsaturation is replaced by epoxide groups. Epoxidized rubber is further described in co-pending U.S. application Ser. No. 10/269,445, which is incorporated herein by reference.

Elastomers having carboxylic acid and anhydride groups, and polymeric metal salts of unsaturated carboxylic acids are further described in co-pending International Application No. PCT/US02/10621, which is incorporated herein by reference.

In one embodiment, the silica-interactive compound is a silica coupling agent. In general, silica coupling agents include a moiety (e.g., an alkoxysilyl or silyl halide group) that will react with the silica filler, and a moiety (e.g., a mercapto, vinyl, or sulfur group) that will react or interact with the elastomer.

Silica coupling agents are further described in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 and 5,696,197, 6,608,145, and 6,667,362, which are incorporated herein by reference. Silica coupling agents include an alkoxysilyl or silyl halide functional group. Examples of silica coupling agents include bis(trialkoxysilylorgano) polysulfides, mercaptosilanes, and blocked mercaptosilanes.

Bis(trialkoxysilylorgano)polysulfides include bis(trialkoxysilylorgano)disulfides and bis(trialkoxysilylorgano)tetrasulfides. Examples of bis(trialkoxysilylorgano)disulfides include 3,3'-bis(triethoxysilylpropyl)disulfide, 3,3'-bis(trimethoxysilylpropyl)disulfide, 3,3'-bis(tributoxysilylpropyl)disulfide, 3,3'-bis(tri-t-butoxysilylpropyl)disulfide, 3,3'-bis(trihexoxysilylpropyl)disulfide, 2,2'-bis(dimethylmethoxysilylethyl)disulfide, 3,3'-bis(diphenylcyclohexoxysilylpropyl)disulfide, 3,3'-bis(ethyl-di-sec-butoxysilylpropyl)disulfide, 3,3'-bis(propyldiethoxysilylpropyl) disulfide, 3,3'-bis(triisopropoxysilylpropyl)disulfide, 3,3'-bis(dimethoxyphenylsilyl-2-methylpropyl)disulfide, and mixtures thereof.

Examples of bis(trialkoxysilylorgano)tetrasulfide silica coupling agents include bis(3-triethoxysilylpropyl)tetrasulfide, bis(2-triethoxysilylethyl)tetrasufide, bis(3-trimethoxysilylpropyl)tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N,N-dimethylthiocarbamoyl tetrasulfide, 3-trimethoxysilylpropyl-benzothiazole tetrasulfide, 3-triethoxysilylpropylbenzothiazole tetrasulfide, and mixtures thereof. Bis(3-triethoxysilylpropyl)tetrasulfide is sold commercially as Si69 by Degussa.

Mercaptosilanes include compounds represented by the formula

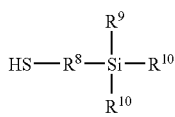

where $R^8$ is a divalent organic group or a bond, $R^9$ is a halogen atom or an alkoxy group, and each $R^{10}$ is independently a halogen, an alkoxy group, or a monovalent organic group. In one embodiment, at least one of $R^9$ and $R^{10}$ is an alkoxy group, and in another embodiment, $R^9$ and each $R^{10}$ is an alkoxy group. In certain embodiments, the alkoxy group has from 1 to 4 carbon atoms. In certain embodiments, the divalent organic group is an alkylene group containing from 1 to about 4 carbon atoms. In certain embodiments, the halogen is chlorine, bromine, iodine, or fluorine, and in one embodiment, the halogen is chlorine.

Examples of mercaptosilanes include 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltripropoxysilane, 18-mercaptooctadecyldiethoxychlorosilane, and mixtures thereof.

Mercaptosilanes also include blocked mercaptosilane compounds when used in conjunction with a deblocking agent. Blocked mercaptosilanes include sulfur-containing silanes where a sulfur atom is bonded to a silyl group, perhaps through a linking moiety, and the sulfur atom is also bonded to a blocking group. During processing, the blocking group is removed to form a mercaptosilane that is capable of acting as a coupling agent. An example of a simple blocked mercaptosilane can be represented by the formula

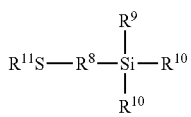

where $R^8$, $R^9$ and $R^{10}$ are as described above, and $R^{11}$ is a blocking group that will come off during processing leaving the S free to react with the polymer. In one embodiment, $R^{11}$ contains an unsaturated heteroatom or carbon chemically bound directly to S via a single bond, and is optionally substituted with one or more carboxylate ester or carboxylic acid functional groups. In another embodiment, $R^{11}$ is a carboxy group having from 1 to about 18 carbon atoms. Blocked mercaptosilanes are further described in U.S. Pat. Nos. 6,579,949 and 6,683,135, which are incorporated herein by reference.

Examples of blocked mercaptosilanes include 2-triethoxysilyl-1-ethyl thioacetate, 2-trimethoxysilyl-1-ethyl thioacetate, 2-(methyldimethoxysilyl)-1-ethyl thioacetate, 3-trimethoxysilyl-1-propyl thioacetate, triethoxysilylmethyl thioacetate, trimethoxysilylmethyl thioacetate, triisopropoxysilylmethyl thioacetate, methyldiethoxysilylmethyl thioacetate, methyldimethoxysilylmethyl thioacetate, methyldiisopropoxysilylmethyl thioacetate, dimethylethoxysilylmethyl thioacetate, dimethylmethoxysilylmethyl thioacetate, dimethylisopropoxysilylmethyl thioacetate, 2-triisopropoxysilyl-1-ethyl thioacetate, 2-(methyldiethoxysilyl)-1-ethyl thioacetate, 2-(methyldiisopropoxysilyl)-1-ethyl thioacetate, 2-(dimethylethoxysilyl)-1-ethyl thioacetate, 2-(dimethylmethoxysilyl)-1-ethyl thioacetate, 2-(dimethylisopropoxysilyl)-1-ethyl thioacetate, 3-triethoxysilyl-1-propyl thioacetate, 3-triisopropoxysilyl-1-propyl thioacetate, 3-methyldiethoxysilyl-1-propyl thioacetate, 3-methyldimethoxysilyl-1-propyl thioacetate, 3-methyldiisopropoxysilyl-1-propyl thioacetate, 1-(2-triethoxysilyl-1-ethyl)-4-thioacetylcyclohexane, 1-(2-triethoxysilyl-1-ethyl)-3-thioacetylcyclohexane, 2-triethoxysilyl-5-thioacetylnorbornene, 2-triethoxysilyl-4-thioacetylnorbornene, 2-(2-triethoxysilyl-1-ethyl)-5-thioacetylnorbornene, 2-(2-triethoxysilyl-1-ethyl)-4-thioacetylnorbornene, 1-(1-oxo-2-thia-5-triethoxysilylpenyl)benzoic acid, 6-triethoxysilyl-1-hexyl thioacetate, 1-triethoxysilyl-5-hexyl thioacetate, 8-triethoxysilyl-1-octyl thioacetate, 1-triethoxysilyl-7-octyl thioacetate, 6-triethoxysilyl-1-hexyl thioacetate, 1-triethoxysilyl-5-octyl thioacetate, 8-trimethoxysilyl-1-octyl thioacetate, 1-trimethoxysilyl-7-octyl thioacetate, 10-triethoxysilyl-1-decyl thioacetate, 1-triethoxysilyl-9-decyl thioacetate, 1-triethoxysilyl-2-butyl thioacetate, 1-triethoxysilyl-3-butyl thioacetate, 1-triethoxysilyl-3-methyl-2-butyl thioacetate, 1-triethoxysilyl-3-methyl-3-butyl thioacetate, 3-trimethoxysilyl-1-propyl thiooctanoate, 3-triethoxysilyl-1-propylthiopalmitate, 3-triethoxysilyl-1-propyl thiooctanoate, 3-triethoxysilyl-1-propyl thiobenzoate, 3-triethoxysilyl-1-propyl thio-2-ethylhexanoate, 3-methyldiacetoxysilyl-1-propyl thioacetate, 3-triacetoxysilyl-1-propyl thioacetate, 2-methyldiacetoxysilyl-1-ethyl thioacetate, 2-triacetoxysilyl-1-ethyl thioacetate, 1-methyldiacetoxysilyl-1-ethyl thioacetate, 1-triacetoxysilyl-1-ethyl thioacetate, tris-(3-triethoxysilyl-1-propyl)trithiophosphate, bis-(3-triethoxysilyl-1-propyl)methyltrithiophosphonate, bis-(3-triethoxysilyl-1-propyl)ethyldithiophosphonate, 3-triethoxysilyl-1-propyldimethylthiophosphinate, 3-triethoxysilyl-1-propyldiethylthiophosphinate, tris-(3-triethoxysilyl-1-propyl)tetrathiophosphate, bis-(3-triethoxysilyl-1-propyl)methyltrithiophosphonate, bis-(3-triethoxysilyl-1-propyl)ethyltrithiophosphonate, 3-triethoxysilyl-1-propyldimethyldithiophosphinate, 3-triethoxysilyl-1-propyldiethyldithiophosphinate, tris-(3-methyldimethoxysilyl-1-propyl)trithiophosphate, bis-(3-methyldimethoxysilyl-1-propyl)methyldithiophosphonate, bis-(3-methyldimethoxysilyl-1-propyl)ethyldithiophosphonate, 3-methyldimethoxysilyl-1-propyldimethylthiophosphinate, 3-methyldimethoxysilyl-1-propyldiethylthiophosphinate, 3-triethoxysilyl-1-propylmethylthiosulphate, 3-triethoxysilyl-1-propylmethanethiosulphonate, 3-triethoxysilyl-1-propylethanethiosulphonate, 3-triethoxysilyl-1-propylbenzenethiosulphonate, 3-triethoxysilyl-1-propyltoluenethiosulphonate, 3-triethoxysilyl-1-propylnaphthalenethiosulphonate, 3-triethoxysilyl-1-propylxylenethiosulphonate, triethoxysilylmethylmethylthiosulphate, triethoxysilylmethylmethanethiosulphonate, triethoxysilylmethylethanethiosulphonate, triethoxysilylmethylbenzenethiosulphonate, triethoxysilylmethyltoluenethiosulphonate, triethoxysilylmethylnaphthalenethiosulphonate, and triethoxysilylmethylxylenethiosulphonate. Blocked mercaptosilanes are commercially available from GE Silicones-OSi Specialties as NXT® silanes.

In one or more embodiments, blocked mercaptosilanes are used in conjunction with a deblocking agent. In certain embodiments, deblocking agents can function as a proton source and a blocking group acceptor. When reaction of the mixture to couple the filler to the polymer is desired, a deblocking agent is added to the mixture to deblock the blocked mercaptosilane. Deblocking agents, which are sometimes referred to as deprotection agents, include N,N'-diphenylguanidine, ethanolamines, ethyleneamines, ethylene glycol, polyethylene glycols, propylene glycol, polypropylene glycols, mixed ethylene-propylene glycols, alkyl-terminated glycols, glycerol, trimethylol alkanes, pentaerythritol, anilines, phenylene diamines, phenol, catechol, dihydroquinone, resorcinol, aminophenols, 1,3-diaminopropane, 1,4-diaminobutane, 1,5-diaminopentane, 1,6-diaminohexane, N-(3-aminopropyl)-1,3-propanediamine (3,3'-iminobispropylamine), 3-amino-1-propanol, imidazole, benzimidazole, aminobenzimidazole, pyrrole, indole, pyrazole, triazole, benzotriazole, and mixtures thereof. In one embodiment, the deblocking agents include N,N'-diphenylguanidine (DPG), glycerol, N-(3-aminopropyl)-1,3-propanediamine (3,3'-iminobispropylamine), diethylene triamine, triethylene tetramine, trimethylol propane, and ethylene glycol. In another embodiment, the deblocking agents include DPG, glycerol, diethylene glycol, and trimethylol propane. In one embodiment, the deblocking agent may be added at quantities ranging from about 0.1 to about 5 phr, and in another embodiment, in the range of from about 0.5 to about 3 phr. Deblocking is further described in U.S. Pat. Nos. 6,579,949 and 6,683,135, which are incorporated herein by reference.

If desired, the silica coupling agent may be added in an amount of from about 0.01 to about 25 parts by weight, per hundred parts by weight silica. In one embodiment, silica coupling agent is added in an amount from about 0.5 to about 15 parts by weight, per hundred parts by weight silica, and in another embodiment, from about 1 to about 10 parts by weight, per hundred parts by weight silica. In one embodiment, where silica-interactive functionalized elastomer is employed, the amount of silica coupling agent may be reduced, when compared to conventional methods.

In one embodiment, the silica-interactive compound is a silica dispersing agent. Silica dispersing agents aid in preventing filler agglomeration and reducing viscosity. Generally, they include monofunctional compounds that react or interact with surface silanol groups on the silica particles, but are not reactive with the elastomer.

Examples of silica dispersing agents include glycols, alkyl alkoxysilanes, fatty acid esters of hydrogenated and non-hydrogenated $C_5$ and $C_6$ sugars, polyoxethylene derivatives of fatty acid esters, and amines. These silica dispersing agents can be used to replace all or part of the bi-functional silica coupling agents, while improving the processability of silica-filled rubber compounds by reducing the compound viscosity, increasing the scorch time, and reducing silica reagglomeration. Specific examples of glycols include diethylene glycol or polyethylene glycol.

Alkyl alkoxysilane silica dispersing agents include an alkoxysilyl functional group and can be described by the formula

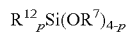

where each $R^7$ is independently as described above, each $R^{12}$ is independently a monovalent organic group, and p is an integer from 1 to 3, with the proviso that at least one $R^{12}$ is an alkyl group. In one embodiment, p is 1.

Examples of alkyl alkoxysilanes include octyl triethoxysilane, octyl trimethoxysilane, cyclohexyl triethoxysilane, isobutyl triethoxysilane, cyclohexyl tributoxysilane, dimethyl diethoxysilane, propyl triethoxysilane, hexyl triethoxysilane, heptyl triethoxysilane, nonyl triethoxysilane, octadecyl triethoxysilane, methyloctyl diethoxysilane, dimethyl dimethoxysilane, methyl trimethoxysilane, propyl trimethoxysilane, hexyl trimethoxysilane, heptyl trimethoxysilane, nonyl trimethoxysilane, and octadecyl trimethoxysilane.

Examples of fatty acid esters of hydrogenated and non-hydrogenated $C_5$ and $C_6$ sugars (e.g., sorbose, mannose, and arabinose) that are useful as silica dispersing agents include the sorbitan oleates, such as sorbitan monooleate, dioleate, trioleate and sesquioleate, as well as sorbitan esters of laurate, palmitate and stearate fatty acids. Fatty acid esters of hydrogenated and non-hydrogenated $C_5$ and $C_6$ sugars are commercially available from ICI Specialty Chemicals (Wilmington, Del.) under the trade name SPAN®. Representative products include SPAN® 60 (sorbitan stearate), SPAN® 80 (sorbitan oleate), and SPAN® 85 (sorbitan trioleate). Other commercially available fatty acid esters of sorbitan include the sorbitan monooleates known as Alkamul® SMO, Capmul® O, Glycomul® O, Arlacel® 80, Emsorb® 2500, and S-Maz® 80.

Examples of polyoxyethylene derivatives of fatty acid esters of hydrogenated and non-hydrogenated $C_5$ and $C_6$ sugars include polysorbates and polyoxyethylene sorbitan esters, which are analogous to the fatty acid esters of hydrogenated and non-hydrogenated sugars noted above except that ethylene oxide groups are placed on each of the hydroxyl groups. Commercially available polyoxyethylene derivatives of sorbitan include POE® (20) sorbitan monooleate, Polysorbate® 80, Tween® 80, Emsorb® 6900, Liposorb® 0-20, and T-Maz® 80. The Tween® products are commercially available from ICI Specialty Chemicals. Silica dispersing agents are further described in U.S. Pat. Nos. 6,342,552, 6,525,118 and 6,608,145, which are incorporated herein by reference.

Generally, a useful amount of these optional silica dispersing aids is from about 0.1 to about 25 parts by weight per hundred parts by weight silica. In one embodiment, the amount of silica dispersing aids is from about 0.5 to about 20 parts by weight per hundred parts by weight silica, and in another embodiment from about 1 to about 15 parts by weight per hundred parts by weight silica.

Silica (silicon dioxide) includes wet-process, hydrated silica produced by a chemical reaction in water, and precipitated as ultra-fine spherical particles. In one embodiment, the silica has a surface area of about 32 to about 400 m²/g, in another embodiment about 100 to about 250 m²/g, and in yet another embodiment, about 150 to about 220 m²/g. The pH of the silica filler in one embodiment is about 5.5 to about 7 and in another embodiment about 5.5 to about 6.8. Commercially available silicas include Hi-Sil™ 215, Hi-Sil™ 233, Hi-Sil™ 255LD, and Hi-Sil™ 190 (PPG Industries; Pittsburgh, Pa.), Zeosil™ 1165 MP and 175GRPlus (Rhodia), Vulkasil™ S/kg (Bary AG), Ultrasil™ VN2, VN3 (Degussa), and HuberSil™ 8745 (Huber).

In one embodiment, silica may be used in an amount of from about 5 to about 100 parts by weight phr, in another embodiment from about 10 to about 90 parts by weight phr, in yet another embodiment from about 15 to about 80 parts by weight phr, and in still another embodiment from about 25 to about 75 parts by weight phr.

Other ingredients that may be employed in the vulcanizable elastomeric compositions and vulcanizates include additional filler, processing aids, additional elastomers, cure agents and accelerators.

Other fillers that may be used include carbon black, alumina, aluminum hydroxide, magnesium hydroxide, clays (hydrated aluminum silicates), and starch. In one embodiment, the total amount of filler employed is from about 1 to about 100 phr, and in another embodiment from about 20 to about 90 parts by weight phr, and in yet another embodiment from about 40 to about 80 parts by weight phr.

Useful carbon black includes any commonly available carbon black, but in one embodiment, the carbon black has a surface area (EMSA) of at least 20 $m^2/g$, and in another embodiment at least 35 $m^2/g$ up to 200 $m^2/g$ or higher. Surface area values used in this application are those determined by ASTM test D-1765 by using the cetyltrimethyl-ammonium bromide (CTAB) technique.

Carbon black can also be used to support any of the silica dispersing aids, nitrogen-containing heterocycles, and silica coupling agents described above. In one embodiment, carbon black may be used in an amount from about 0.5 to about 70 parts by weight phr, in another embodiment from about 1 to about 50 parts by weight phr, and in yet another embodiment from about 2 to about 40 parts by weight phr.

The term processing aids commonly includes a broad category of substances that improve various aspects of the process of forming vulcanizable compositions and vulcanizates. For example, processing aids may prevent filler agglomeration and reduce viscosity.

Certain additional fillers can be utilized as processing aids, including clay (hydrous aluminum silicate), talc (hydrous magnesium silicate), aluminum hydrate $[Al(OH)_3]$, mica, and sodium sulfate. In certain embodiments, micas principally contain alumina and silica. In one embodiment, these fillers can be present in the amount of from about 0.5 to about 40 parts per phr, in another embodiment, in an amount of about 1 to about 20 phr, and in yet another embodiment in an amount of about 1 to about 10 phr. These additional fillers can also be used as carriers to support any of the silica dispersing aids, nitrogen-containing heterocycles, and silica coupling agents described above.

One or more additional elastomers, sometimes called rubbery elastomers or rubbery polymers, may be employed. Elastomers that may be used include natural and synthetic elastomers. The synthetic elastomers typically derive from the polymerization of conjugated diene monomers. These conjugated diene monomers may be copolymerized with other monomers such as vinyl aromatic monomers. Other rubbery elastomers may derive from the polymerization of ethylene together with one or more α-olefins and optionally one or more diene monomers.

Useful rubbery elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped.

In one embodiment, from about 5 to about 100 percent of the total elastomer molecules are functionalized with the silica-interactive functional group. In another embodiment, from about 10 to about 90 percent and in yet another embodiment from about 20 to about 80 percent of the total elastomer molecules are functionalized with the silica-interactive functional group.

A multitude of rubber curing agents may be employed, including sulfur or peroxide-based curing systems. Curing agents are described in *Kirk-Othmer, Encyclopedia of Chemical Technology*, Vol. 20, pp. 365-468, ($3^{rd}$ Ed. 1982), particularly *Vulcanization Agents and Auxiliary Materials*, 390-402, and A. Y. Coran, *Vulcanization in Encyclopedia of Polymer Science and Engineering*, ($2^{nd}$ Ed. 1989), which are incorporated herein by reference. Vulcanizing agents may be used alone or in combination.

The vulcanization accelerators are not particularly limited. Examples include thiazoles, dithiocarbamates, dithiophosphates, guanidines, sulfenamides, sulfenimides, and thiurams. Specific examples include 2-mercaptobenzothiazol, dibenzothiazyl disulfide, N-cyclohexyl-2-benzothiazyl-sulfenamide (CBS), N-tert-butyl-2-benzothiazyl sulfenamide (TBBS), and 1,3-diphenylguanidine. In one embodiment, the amount of accelerator is from about 0.1 to about 5 phr, and in another embodiment, from about 0.2 to about 3 phr.

Oils, waxes, scorch inhibiting agents, tackifying resins, reinforcing resins, fatty acids, peptizers, and zinc oxide may also be employed.

The present invention provides a method for forming a mixture of ingredients including a silica particle, a silica-interactive compound, and a nitrogen-containing heterocycle. The order in which the silica particle, silica-interactive compound and nitrogen-containing heterocycle are added can vary within the scope of the invention, however in certain embodiments, increased interaction between the silica particle and silica-interactive compound is believed to occur when the silica particle and the silica-interactive compound are combined in the presence of the nitrogen-containing heterocycle.

In one embodiment, the mixture is a vulcanizable rubber composition, such as a tire formulation. It is known that within tire formulations, hydrolytic bonding can occur between silica particles, causing agglomeration, or between functional groups of a functionalized elastomer. It is believed that the nitrogen-containing heterocycle aids in breaking these hydrolytic bonds, allowing increased interaction between the particle and the elastomer. When the nitrogen-containing heterocycle is mixed with just the functionalized elastomer however, it is believed that the hydrolytic bonds of the functionalized elastomer break, but then may re-form if there is no silica particle to interact with. Likewise, when the nitrogen-containing heterocycle is mixed with just the silica particles, it is believed that the hydrolytic bonds of the silica particles break, but then may re-form if there is no silica interactive compound to interact with. In one embodiment, therefore, the nitrogen-containing heterocycle is added to a mixture containing a silica particle and silica-interactive compound.

Generally, tire formulations are prepared by a multi-step process. For example, multiple mixing steps are typically employed when preparing silica-filled rubber compositions, as described in U.S. Pat. Nos. 5,227,425, 5,719,207, 5,717,022, as well as European Patent No. 890,606, which are incorporated herein by reference.

The vulcanizable rubber composition may be prepared by forming an initial masterbatch composition that includes elastomer, silica, and optionally other ingredients. To prevent premature vulcanization, this initial composition generally excludes any vulcanizing agents. One or more of the ingredients may be added in increments.

Once the initial masterbatch composition is processed, the vulcanizing agents may be introduced and blended into the initial masterbatch to form a final mix. Additional ingredients, such as accelerators, may be added to the final mix during this stage. Typically, the final mix is prepared at low temperatures that do not initiate the vulcanization process.

Optionally, additional mixing stages can be employed between the initial mix stage and the final mix stage. Additional mixing stages where no additional ingredients are added can be referred to as remill stages, while mixing stages where ingredients are added are called masterbatch stages, and can be further denoted by ordinal designations, such as second masterbatch and so on.

One or more ingredients may be premixed with a carrier. Carriers include any material that is not deleterious to the mixture. Examples include stearic acid, mineral oil, plastics, wax and organic solvents. In one embodiment, the nitrogen-containing heterocycle is combined with a carrier to form a premix. In this or other embodiments, the premix contains from about 1 part by weight heterocycle per 3 parts by weight carrier to about 1 part by weight heterocycle per 1 part by weight carrier.

In one embodiment, the initial masterbatch composition includes a silica-interactive functionalized elastomer, silica, a nitrogen-containing heterocycle, and optionally other ingredients including additional elastomer and carbon black.

Silica coupling agents and silica dispersing agents are optional ingredients, and may be added as part of the initial composition, or may be added to the initial composition during an additional masterbatch step. In one embodiment, the nitrogen-containing heterocycle is added prior to or at the same time as the silica coupling agent or silica dispersing agent.

In certain embodiments, where a silica-interactive functionalized elastomer is employed, the amount of zinc oxide, sulfur and cure agents present during the first mixing stage is limited. The amount of silica processing aids, silica coupling agents and other polar compounds is also limited in one or more embodiments. While it is acknowledged that the functionalized elastomer and silica may have some polar character, it may be desirable to reduce or eliminate the presence of all other polar compounds. Therefore, the term other polar compounds is used to refer to those polar compounds in addition to zinc oxide, silica processing aids, and silica coupling agents, as well as the elastomer having a silica-interactive functional group, the silica, and the catalyst. For example, other polar ingredients that may be limited include stearic acid, although the catalyst is often associated with a carrier such as stearic acid and therefore it may not be practical to completely eliminate the presence of all other polar compounds. The compounds that may be limited from the first mixing step may be referred to collectively as the limited compounds.

In one embodiment, the amount of any individual limited compound present during the first mixing stage is less than about 5 parts by weight phr, in another embodiment less than about 3 parts by weight phr, in yet another embodiment less than about 2 parts by weight phr, in still another embodiment 0.5 parts by weight phr, in another embodiment less than about 0.2 parts by weight phr, in yet another embodiment less than about 0.1 parts by weight phr. In one embodiment, the first mixing step is executed in the substantial absence of the limited compounds. Substantial absence refers to an amount that is less than the amount that would have an appreciable impact on the method of the present invention. In one embodiment, the first mixing step is devoid of zinc oxide, silica processing aids, silica coupling agents, and other polar compounds.

Two types of temperatures will be referred to herein. One type, the mixer temperature, refers to the stabilized temperature of the mixing equipment prior to addition of the ingredients. The second type refers to the surface temperature of the composition. Unless specifically referred to as the mixer temperature, any reference to temperature in this specification should be understood to mean the surface temperature of the composition.

For the initial masterbatch mixing step, and any subsequent masterbatch mixing steps, the initial mixer temperature is, in one embodiment, at least about 25° C., in another embodiment, at least about 50° C., in yet another embodiment, at least about 60° C. In one embodiment, the initial mixer temperature is from about 70° C. to about 140° C. The mixing conditions may be controlled to maintain the surface temperature of the composition within the range of, in one embodiment, about 25° C. to about 195° C., in another embodiment, about 100° C. to about 185° C., in yet another embodiment, about 120° C. to about 170° C., and in still another embodiment, about 135° C. to about 165° C. during mixing. These mixing conditions may be maintained for the amount of time necessary to achieve good dispersion of the filler within the rubber. One of ordinary skill in the art will appreciate that the necessary amount of time will vary depending upon such factors as mixer size, sheer, temperature, and the like.

In between each mixing stage, the mixed composition may be cooled to a surface temperature below the intended temperature for the next mixing step. This may be accomplished by discharging the mixed composition, cooling, and re-charging the same mixer apparatus or transferring the composition to another mixer. Alternatively, the mixed composition may be cooled within the mixer. In one embodiment, the composition is cooled to room temperature.

In one embodiment, the mixing conditions may be controlled during the optional remill mixing steps, to achieve a surface temperature of the composition within the range of about 70° C. to about 175° C., in another embodiment, about 135° C. to about 165° C., and in yet another embodiment about 140° C. to about 160° C. These mixing conditions are maintained for the amount of time necessary to reduce the viscosity and improve the dispersion of the filler within the rubber. One of ordinary skill in the art will appreciate that the necessary amount of time will vary depending upon such factors as mixer size, sheer, temperature, and the like. A remill step may be performed in the same mixer used for the masterbatches, or the mixture may be transferred to another mixer.

In one or more embodiments, the final mixing stage, during which the cure agents and accelerators are added, is performed at a temperature below the vulcanization temperature. In one embodiment, the mixing conditions are controlled to achieve a surface temperature of the composition within the range of about 40° C. to about 120° C., in another embodiment about 60° C. to about 110° C., and in yet another embodiment about 75° C. to about 100° C. These conditions may be maintained for the amount of time necessary to achieve good mixing.

The method of this invention is particularly useful in preparing tire components such as treads, subtreads, black sidewalls, body ply skins, bead filler, and the like. The construction and curing of the tire is not affected by the practice of this invention. Rubber compounding techniques and the additives employed therein are further described in Stephens, *The Compounding and Vulcanization of Rubber*, in *Rubber Technology* ($2^{nd}$ Ed. 1973).

Where the vulcanizable rubber compositions are employed in the manufacture of tires, these compositions can be processed into tire components according to ordinary tire manufacturing techniques including standard rubber shaping, molding and curing techniques. Pneumatic tires can be made as discussed in U.S. Pat. Nos. 5,866,171, 5,876,527, 5,931,211, and 5,971,046, which are incorporated herein by reference.

In certain embodiments, the tire compositions of this invention advantageously have improved rubber compound reinforcement, which is believed to be caused by increased polymer-filler interaction, and which results in improved rolling resistance, reduced wear, and improved wet traction. Excellent polymer processability may be maintained. These tire compositions can be readily prepared by the subject method.

In order to demonstrate the practice of the present invention, the following examples have been prepared and tested. The examples should not, however, be viewed as limiting the scope of the invention. The claims will serve to define the invention.

EXAMPLES

Synthesis of Trialkoxysilyl-Functionalized SBR Polymer

Trialkoxysilyl-functionalized SBR polymer was prepared by conventional anionic semi-batch polymerization using n-butyllithium as an initiator and tetraethyl orthosilicate as a terminator. Sorbitan trioleate and 2-ethylhexanoic acid were added and the polymer was stabilized with 2,6-di-t-butyl-p-cresol. The polymer was coagulated and drum dried. NMR analysis of this base polymer indicated a styrene content of about 34 percent and approximately 17 percent of the butadiene in the 1,2-configuration. The polymer was characterized as shown in Table I.

TABLE I

| | |
|---|---|
| $M_w$ (kg/mol) | 295 |
| $M_n/M_w$ (kg/mol) | 1.51 |
| Styrene in SBR (%) | 34 |
| Vinyl in SBR (%) | 17 |
| $T_g$ (° C.) | −45° C. |

Examples 1-5

Preparation of Vulcanizable Elastomeric Composition

The trialkoxysilyl-functionalized SBR polymer was employed in carbon black/silica tire formulations. The formulations are presented in Table II. More specifically, imidazole was present in various amounts for Examples 3-6.

TABLE II

| | Example No. | | | | |
|---|---|---|---|---|---|
| | 2 | 3 | 4 | 5 | 6 |
| Initial (parts by weight) | | | | | |
| Trialkoxysilyl-functionalized SBR | 100 | 100 | 100 | 100 | 100 |
| Imidazole | 0 | 0.2 | 0.5 | 1.0 | 2.0 |
| Carbon Black* | 40 | 40 | 40 | 40 | 40 |
| Silica | 35 | 35 | 35 | 35 | 35 |
| Wax | 1.5 | 1.5 | 1.5 | 1.5 | 1.5 |
| Antioxidant | 0.95 | 0.95 | 0.95 | 0.95 | 0.95 |
| Talc | 10 | 10 | 10 | 10 | 10 |

TABLE II-continued

| | Example No. | | | | |
|---|---|---|---|---|---|
| | 2 | 3 | 4 | 5 | 6 |
| Aromatic Oil | 29.16 | 29.16 | 29.16 | 29.16 | 29.16 |
| Stearic acid | 0.50 | 0.50 | 0.50 | 0.50 | 0.50 |
| Second (parts by weight) | | | | | |
| Disulfane | 3.15 | 3.15 | 3.15 | 3.15 | 3.15 |
| Final (parts by weight) | | | | | |
| Sulfur | 2.30 | 2.30 | 2.30 | 2.30 | 2.30 |
| Zinc Oxide | 1.70 | 1.70 | 1.70 | 1.70 | 1.70 |
| Accelerators | 3.5 | 3.5 | 3.5 | 3.5 | 3.5 |

*SAF

Each carbon black/silica rubber compound was prepared in three stages named Initial Masterbatch, Second Masterbatch, and Final. In the initial stage, alkoxysilyl-functionalized SBR was mixed with silica, carbon black, and other ingredients as listed in Table II in a 1300 g Banbury mixer operating at 60 RPM and initially at about 99° C. The initials were mixed for 150 seconds. At the end of the mixing the temperature was approximately 155° C. The samples were cooled to less than about 80° C. and transferred to a remill mixer.

In the second masterbatch stage, the initial composition was mixed with disulfane at about 60 RPM. The starting temperature of the mixer was about 80° C. The remill material was removed from the mixer after about 2 minutes, when the material temperature was between 135° C. and 145° C.

The finals were mixed by adding the second masterbatch compositions, curative materials, and other ingredients as listed in Table II to the mixer simultaneously. The starting mixer temperature was 62° C. and it was operating at 60 RPM. The final composition was removed from the mixer after 1 minute, when the material temperature was about 93° C.

Test specimens of each rubber formulation were prepared by cutting out the required mass from an uncured sheet (about 2.5 mm to 3.81 mm thick), and cured within closed cavity molds under pressure for 15 minutes at 171° C. The test specimens were then subjected to various physical tests, and the results of these tests are reported in Table III. Tensile mechanical properties were measured using ASTM-D 412 at 25° C. Tear mechanical properties were measured using ASTM-D 624 at 171° C. Dynamic properties were determined by using a Rheometrics Dynamic Analyzer (RDA). Tan δ was obtained from temperature sweep experiments conducted with a frequency of 31.4 rad/sec using 0.5% strain for temperatures ranging from −100° C. to −10° C., and with 2% strain for temperatures ranging from −10° C. to 100° C. Strain sweep experiments on an RPA 2000 Rubber Process Analyzer (Alpha Technologies) were used to obtain ΔG' data, at a frequency of 0.1 Hz (6.2832 rad/sec) and a temperature of 50° C., with strain sweeping from 0.25% to 1000%.

The green stock Mooney viscosity measurements were taken at 130° C. The sample was preheated for 1 minute, a large rotor was started, and the torque was measured after 4 minutes of rotation. Mooney scorch measurements, specifically the time required for an increase of 5 Mooney units (T5) can indicate how fast the compound viscosity will increase during extrusion processes. Curing characteristics were measured using a Monsanto Rheometer MD2000, at a frequency of 1.67 Hz, 160° C., and a strain of 7%. MH and ML are the measured maximum and minimum torques, respectively. TS2 is the time required for the torque to reach 2% of the total torque increase during the curing process. T90 is the time required for the torque to reach 90% of the total torque increase during the curing process. Likewise, T10 is the time required for the torque to reach 10% of the total torque increase during the curing process.

Bound rubber, a measure of polymer was determined by solvent extraction with toluene at room temperature. More specifically, a test specimen of each uncured rubber formulation was placed in toluene for three days. The solvent was removed and the residue was dried and weighed. The percentage of bound rubber was then determined according to the formula % bound rubber=$(100(W_d - F))/R$ where $W_d$ is the weight of the dried residue, F is the weight of the filler and any other solvent insoluble matter in the original sample, and R is the weight of the rubber in the original sample.

The Zwick Rebound Test is a dynamic test that measures rebound resilience. Rebound resilience is typically defined as the ratio of mechanical energies before and after impact. Samples were tested according to ASTM D1054-91(2000). Sample specimens were milled and cured according to ASTM D1054, using the mold specified. The cured sample was coated with talc and conditioned in an oven for about one hour at the recommended temperature. The conditioned sample was placed into a Zwick type rebound tester, a pendulum was swung against the sample, and the angle at which the pendulum bounced back was measured. Percent rebound is calculated according to the equation specified in ASTM D1054.

The filler flocculation behaviour of each compound was evaluated by examining the Payne Effect data ($\delta(\Delta G')$) in the rubber compound prior to the addition of curatives and after thermal annealing, where ($\delta(\Delta G')$) is defined as:

$\delta(\Delta G') = \Delta G$ with thermal annealing $- \Delta G$ without thermal annealing

TABLE III

| | Sample No. | | | | |
|---|---|---|---|---|---|
| | 2 | 3 | 4 | 5 | 6 |
| Green Stock Mooney & Curing Characteristics | | | | | |
| Mooney @ 130° C. | 72.75 | 71.51 | 75.06 | 74.83 | 74.03 |
| T5 scorch @ 130° C. (sec) | 882 | 968 | 1090 | 1107 | 943 |
| TS2 @ 160° C. (min) | 3.07 | 3.25 | 3.43 | 3.44 | 2.94 |
| T10 @ 160° C. (min) | 2.90 | 3.13 | 3.33 | 3.39 | 2.94 |
| T90 @ 160° C. (min) | 10.37 | 8.32 | 7.11 | 7.42 | 6.28 |
| Bound Rubber Content (%) | 44.68 | 47.36 | 53.58 | 59.35 | 63.85 |
| Degree of filler flocculation δ (ΔG') | 3476 | 1821 | 1747 | 1555 | 1527 |
| Viscoelastic Properties (temperature sweeps & dynastat) | | | | | |
| G' @ -20° C. (MPa) | 81.14 | 86.70 | 75.90 | 73.78 | 71.84 |
| tan δ @ 0° C. (T.S.) | 0.4329 | 0.4486 | 0.4471 | 0.4392 | 0.4588 |
| tan δ @ 50° C. (T.S.) | 0.2698 | 0.2478 | 0.2275 | 0.2117 | 0.1961 |
| tan δ @ 0° C. (Dyna) | 0.3098 | 0.3209 | 0.3295 | 0.3289 | 0.3259 |
| tan δ @ 50° C. (Dyna) | 0.2220 | 0.2088 | 0.1963 | 0.1845 | 0.1833 |
| Zwick Rebound Resilience @ 50° C. | 45.2 | 46.2 | 48.2 | 49.6 | 50.2 |

Various modifications and alterations that do not depart from the scope and spirit of this invention will become apparent to those skilled in the art. This invention is not to be duly limited to the illustrative embodiments set forth herein.

What is claimed is:

1. A method for preparing a tire, the method comprising the steps of:
   mixing ingredients including silica and at least one elastomer to form a first mixture, where the elastomer optionally includes silica-interactive functionalized elastomer;
   cooling the first mixture;
   further mixing the first mixture, optionally with additional ingredients including a silica coupling agent and a silica dispersing agent, to form an intermediate mixture, with the proviso that at least one of the ingredients mixed to form the first mixture or the additional ingredients added to form the intermediate mixture includes a silica-interactive compound;
   adding ingredients including a curative to the intermediate mixture to form a vulcanizable mixture;
   mixing the vulcanizable mixture;
   forming the vulcanizable mixture into a tire component;
   building a tire by including the tire component;
   curing the tire; where a nitrogen-containing heterocycle is added to at least one of said step of mixing ingredients to form a first mixture or said step of further mixing to form an intermediate mixture, and where the nitrogen-containing heterocycle is an imidazole compound.

2. The method of claim 1, where the nitrogen-containing heterocycle includes a substituted or unsubstituted imidazole represented by the formula

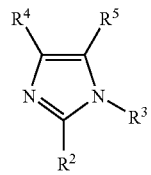

where $R^2$, $R^3$, $R^4$, and $R^5$ are independently a hydrogen atom or a monovalent organic group or where any two or more of $R^2$, $R^3$, $R^4$, or $R^5$ combine to form a multivalent organic group.

3. The method of claim 1, where the silica-interactive compound includes a functionalized elastomer including an alkoxysilyl, amine, hydroxyl, polyalkylene glycol, epoxy, carboxylic acid, or anhydride group, or a metal salt of a carboxylic acid.

4. The method of claim 3, where the functionalized elastomer can be represented by the formula

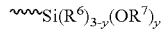

where ∼∼∼ is an elastomeric polymer, each $R^6$ is independently a halogen or a monovalent organic group, each $R^7$ is independently a monovalent organic group, and y is an integer from 1 to 3.

5. The method of claim 4, where ∼∼∼ includes an anionically polymerized polymer.

6. The method of claim 1, where the silica-interactive compound includes a silica coupling agent.

7. The method of claim 6, where the silica coupling agent includes a bis(trialkoxysilylorgano) polysulfide, mercaptosilane, or blocked mercaptosilane.

8. The method of claim 7, where the silica coupling agent is 3,3'-bis (triethoxysilylpropyl) disulfide, 3,3'-bis (trimethoxysilylpropyl) disulfide, 3,3'-bis(tributoxysilyl-propyl) disulfide, 3,3'-bis (tri-t-butoxysilylpropyl) disulfide, 3,3'-bis(trihexoxysilylpropyl) disulfide, 2,2'-bis (dimethylmethoxysilylethyl) disulfide, 3,3'-bis(diphenylcyclohexoxysilylpropyl) disulfide, 3,3'-bis(ethyl-di-sec-butoxysilylpropyl) disulfide, 3,3'-bis(propyldiethoxysilylpropyl) disulfide, [3,3'-bis(triisopropoxysilylpropyl) disulfide], 3,3'-bis (dimethoxyphenylsilyl-2-methylpropyl) disulfide, bis(3-triethoxysilylpropyl) tetrasulfide, bis(2-triethoxysilylethyl) tetrasufide, bis(3-trimethoxysilylpropyl) tetrasulfide, 3-trimethoxysilylpropyl-N,N-dimethylthiocarbamoyl tetrasulfide, 3triethoxysilylpropyl-N,N-dimethylthiocarbamoyl tetrasulfide, 2-triethoxysilyl-N,N-dimethylthiocarbamoyl tetrasulfide, 3-trimethoxysilylpropyl-benzothiazole tetrasulfide, 3-triethoxysilylpropylbenzothiazole tetrasulfide, 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltriproproxysilane, 18-mercaptooctadecyldiethoxychlorosilane, or mixtures thereof.

9. The method of claim 1, where the silica-interactive compound includes a silica dispersing agent.

10. The method of claim 9, where the silica dispersing agent includes a glycol or an alkylalkoxysilane that can be described by the formula

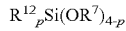

where each $R^7$ is independently as described above, each $R^{12}$ is independently a monovalent organic group, and p is an integer from 1 to 3, with the proviso that at least one $R^{12}$ is an alkyl group.

11. The method of claim 10, where the silica dispersing agent is diethylene glycol or polyethylene glycol, octyl triethoxysilane, octyl trimethoxysilane, cyclohexyl triethoxysilane, isobutyl triethoxysilane, cyclohexyl tributoxysilane, dimethyl diethoxysilane, propyl triethoxysilane, hexyl triethoxysilane, heptyl triethoxysilane, nonyl triethoxysilane, octadecyl triethoxysilane, methyloctyl diethoxysilane, dimethyl dimethoxysilane, methyl trimethoxysilane, propyl trimethoxysilane, hexyl trimethoxysilane, heptyl trimethoxysilane, nonyl trimethoxysilane, octadecyl trimethoxysilane, methyloctyl dimethoxysilane, or mixtures thereof.

12. The method of claim 1, where the nitrogen-containing heterocycle is added prior to or during said step of mixing silica and at least one elastomer.

13. The method of claim 1, where the nitrogen-containing heterocycle is added prior to or during said step of further mixing to form an intermediate mixture.

14. The method of claim 1, where the nitrogen-containing heterocycle is added after said step of cooling.

15. The method of claim 1, where the vulcanizable mixture comprises from about 0.005 to about 8 parts by weight nitrogen-containing heterocycle per hundred parts silica.

16. The method of claim 1, where the vulcanizable mixture comprises from about 0.01 to about 25 parts by weight silica coupling agent per hundred parts silica.

17. The method of claim 1, where the vulcanizable mixture comprises from about 0.1 to about 25 parts by weight silica dispersing aid per hundred parts silica.

18. The method of claim 1, where the imidazole compound is selected from the group consisting of imidazole, 4-ethylamino imidazole, 2-mercapto-1-methyl imidazole, 1-methyl imidazole, 2,4,5-triphenyl imidazole, 2-methyl imidazole, 2-ethyl-4-methyl imidazole, and 2-heptadecyl imidazole.

19. A method for preparing a tire, the method comprising the steps of:
mixing ingredients including silica and at least one elastomer to form a first mixture, where the elastomer optionally includes silica-interactive functionalized elastomer;
cooling the first mixture;
further mixing the first mixture, optionally with additional ingredients including a silica coupling agent and a silica dispersing agent, to form an intermediate mixture, with the proviso that at least one of the ingredients mixed to form the first mixture or the additional ingredients added to form the intermediate mixture includes a silica-interactive compound;
adding ingredients including a curative to the intermediate mixture to form a vulcanizable mixture;
mixing the vulcanizable mixture;
forming the vulcanizable mixture into a tire component;
building a tire by including the tire component; and
curing the tire; where an imidazole compound is added to at least one of said step of mixing ingredients to form a first mixture or said step of further mixing to form an intermediate mixture, and where a cured sample of the tire component is characterized by a tan delta at 50° C. that is reduced when compared to a cured tire component prepared by the same method except that no imidazole is present.

20. The method of claim 19, where the tan delta is measured by temperature sweep experiments conducted with a frequency of 31.4 rad/sec using 2% strain for temperatures ranging from −10° C. to 100° C.

21. The method of claim 20, where the tan delta 50° C. is reduced by at least 8%.

* * * * *